(12) United States Patent
Resch et al.

(10) Patent No.: US 11,416,149 B1
(45) Date of Patent: Aug. 16, 2022

(54) SELECTING A PROCESSING UNIT IN ACCORDANCE WITH A CUSTOMIZABLE DATA PROCESSING PLAN

(71) Applicant: Pure Storage, Inc., Mountain View, CA (US)

(72) Inventors: Jason K. Resch, Chicago, IL (US); S. Christopher Gladwin, Chicago, IL (US); Kumar Abhijeet, Chicago, IL (US); Greg R. Dhuse, Chicago, IL (US)

(73) Assignee: Pure Storage, Inc., Mountain View, CA (US)

( * ) Notice: Subject to any disclaimer, the term of this patent is extended or adjusted under 35 U.S.C. 154(b) by 15 days.

(21) Appl. No.: 16/944,923

(22) Filed: Jul. 31, 2020

Related U.S. Application Data

(63) Continuation of application No. 16/050,583, filed on Jul. 31, 2018, now abandoned, which is a
(Continued)

(51) Int. Cl.
*G06F 3/06* (2006.01)
*G06F 11/10* (2006.01)

(52) U.S. Cl.
CPC ............ *G06F 3/0619* (2013.01); *G06F 3/067* (2013.01); *G06F 3/0638* (2013.01);
(Continued)

(58) Field of Classification Search
CPC .... G06F 3/0619; G06F 3/0638; G06F 3/0659; G06F 3/067; G06F 11/1076; G06F 11/1092
See application file for complete search history.

(56) References Cited

U.S. PATENT DOCUMENTS

| 4,092,732 A | 5/1978 | Ouchi |
| 5,454,101 A | 9/1995 | Mackay |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Prasith Thammavong
(74) *Attorney, Agent, or Firm* — Garlick & Markison; Timothy W. Markison; Timothy D. Taylor

(57) ABSTRACT

A method includes determining, by a computing device of a plurality of computing devices of a storage network, a data processing plan for processing an access request. The method further includes identifying two or more processing units of a plurality of processing units of the storage network based on the data processing plan and availability information, and determining processing capabilities of each of the two or more processing units. The method further includes selecting a processing unit of the two or more processing units to process the access request based on a favorable comparison of the processing capabilities of the processing unit and the data processing plan. The method further includes selecting one or more processing options of the processing unit to process the access request according to the data processing plan, and sending the access request and selection of the one or more processing options to the processing unit.

20 Claims, 7 Drawing Sheets

Related U.S. Application Data continuation-in-part of application No. 14/325,433, filed on Jul. 8, 2014, now Pat. No. 10,067,831, which is a continuation-in-part of application No. 12/903,209, filed on Oct. 13, 2010, now Pat. No. 9,152,489.

(60) Provisional application No. 61/290,775, filed on Dec. 29, 2009.

(52) U.S. Cl.
CPC ........ *G06F 3/0659* (2013.01); *G06F 11/1076* (2013.01); *G06F 11/1092* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers |
| 5,802,364 A | 9/1998 | Senator |
| 5,809,285 A | 9/1998 | Hilland |
| 5,890,156 A | 3/1999 | Rekieta |
| 5,987,622 A | 11/1999 | Lo Verso |
| 5,991,414 A | 11/1999 | Garay |
| 6,012,159 A | 1/2000 | Fischer |
| 6,058,454 A | 5/2000 | Gerlach |
| 6,128,277 A | 10/2000 | Bruck |
| 6,175,571 B1 | 1/2001 | Haddock |
| 6,192,472 B1 | 2/2001 | Garay |
| 6,256,688 B1 | 7/2001 | Suetaka |
| 6,272,658 B1 | 8/2001 | Steele |
| 6,301,604 B1 | 10/2001 | Nojima |
| 6,356,949 B1 | 3/2002 | Katsandres |
| 6,366,995 B1 | 4/2002 | Vilkov |
| 6,374,336 B1 | 4/2002 | Peters |
| 6,415,373 B1 | 7/2002 | Peters |
| 6,418,539 B1 | 7/2002 | Walker |
| 6,449,688 B1 | 9/2002 | Peters |
| 6,567,948 B2 | 5/2003 | Steele |
| 6,571,282 B1 | 5/2003 | Bowman-Amuah |
| 6,609,223 B1 | 8/2003 | Wolfgang |
| 6,718,361 B1 | 4/2004 | Basani |
| 6,732,230 B1 | 5/2004 | Johnson |
| 6,760,808 B2 | 7/2004 | Peters |
| 6,785,768 B2 | 8/2004 | Peters |
| 6,785,783 B2 | 8/2004 | Buckland |
| 6,826,711 B2 | 11/2004 | Moulton |
| 6,879,596 B1 | 4/2005 | Dooply |
| 7,003,688 B1 | 2/2006 | Pittelkow |
| 7,024,451 B2 | 4/2006 | Jorgenson |
| 7,024,609 B2 | 4/2006 | Wolfgang |
| 7,080,101 B1 | 7/2006 | Watson |
| 7,103,824 B2 | 9/2006 | Halford |
| 7,103,915 B2 | 9/2006 | Redlich |
| 7,111,115 B2 | 9/2006 | Peters |
| 7,140,044 B2 | 11/2006 | Redlich |
| 7,146,644 B2 | 12/2006 | Redlich |
| 7,171,493 B2 | 1/2007 | Shu |
| 7,222,133 B1 | 5/2007 | Raipurkar |
| 7,240,236 B2 | 7/2007 | Cutts |
| 7,272,613 B2 | 9/2007 | Sim |
| 7,636,724 B2 | 12/2009 | de la Torre |
| 9,250,823 B1 | 2/2016 | Kamat |
| 2002/0062422 A1 | 5/2002 | Butterworth |
| 2002/0166079 A1 | 11/2002 | Ulrich |
| 2003/0018927 A1 | 1/2003 | Gadir |
| 2003/0037261 A1 | 2/2003 | Meffert |
| 2003/0065617 A1 | 4/2003 | Watkins |
| 2003/0084020 A1 | 5/2003 | Shu |
| 2004/0024963 A1 | 2/2004 | Talagala |
| 2004/0122917 A1 | 6/2004 | Menon |
| 2004/0215998 A1 | 10/2004 | Buxton |
| 2004/0228493 A1 | 11/2004 | Ma |
| 2005/0100022 A1 | 5/2005 | Ramprashad |
| 2005/0114594 A1 | 5/2005 | Corbett |
| 2005/0125593 A1 | 6/2005 | Karpoff |
| 2005/0131993 A1 | 6/2005 | Fatula, Jr. |
| 2005/0132070 A1 | 6/2005 | Redlich |
| 2005/0144382 A1 | 6/2005 | Schmisseur |
| 2005/0229069 A1 | 10/2005 | Hassner |
| 2005/0273686 A1 | 12/2005 | Turner |
| 2006/0047907 A1 | 3/2006 | Shiga |
| 2006/0136448 A1 | 6/2006 | Cialini |
| 2006/0156059 A1 | 7/2006 | Kitamura |
| 2006/0224603 A1 | 10/2006 | Correll, Jr. |
| 2007/0079081 A1 | 4/2007 | Gladwin |
| 2007/0079082 A1 | 4/2007 | Gladwin |
| 2007/0079083 A1 | 4/2007 | Gladwin |
| 2007/0088970 A1 | 4/2007 | Buxton |
| 2007/0115906 A1 | 5/2007 | Gao |
| 2007/0174192 A1 | 7/2007 | Gladwin |
| 2007/0214285 A1 | 9/2007 | Au |
| 2007/0234110 A1 | 10/2007 | Soran |
| 2007/0283167 A1 | 12/2007 | Venters, III |
| 2008/0225714 A1* | 9/2008 | Denis ...................... H04L 47/11 370/232 |
| 2009/0094251 A1 | 4/2009 | Gladwin |
| 2009/0094318 A1 | 4/2009 | Gladwin |
| 2010/0023524 A1 | 1/2010 | Gladwin |
| 2010/0146148 A1 | 6/2010 | Schwimer |
| 2012/0278511 A1 | 11/2012 | Alatorre |
| 2013/0138706 A1* | 5/2013 | Dhuse ................. G06F 12/1408 707/827 |
| 2013/0166556 A1 | 6/2013 | Baeumges |
| 2014/0281700 A1 | 9/2014 | Nagesharao |
| 2016/0062694 A1* | 3/2016 | Makkar ................. G06F 3/0629 711/111 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; Ie If Network Working Group RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

(56) References Cited

OTHER PUBLICATIONS

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner

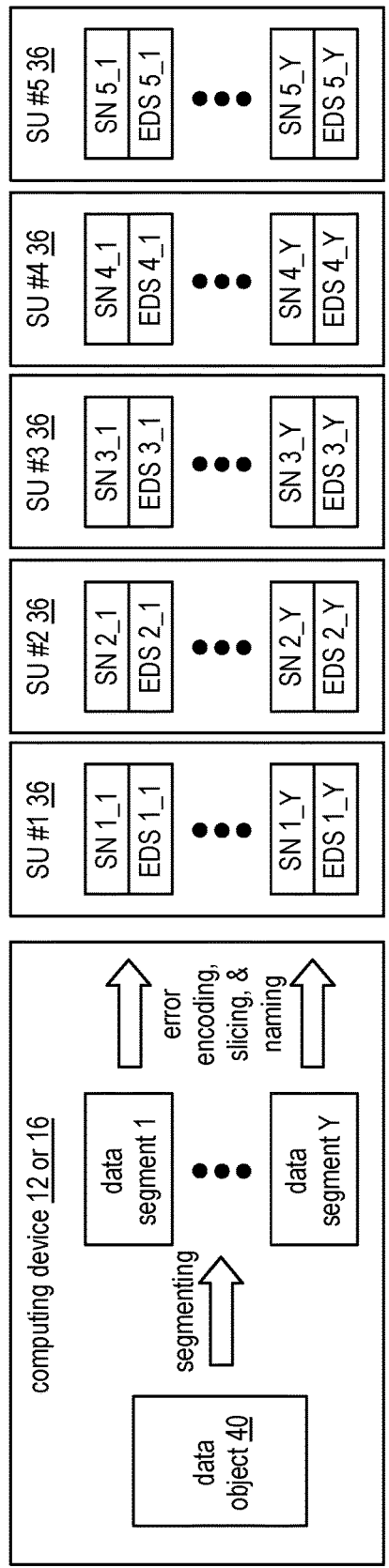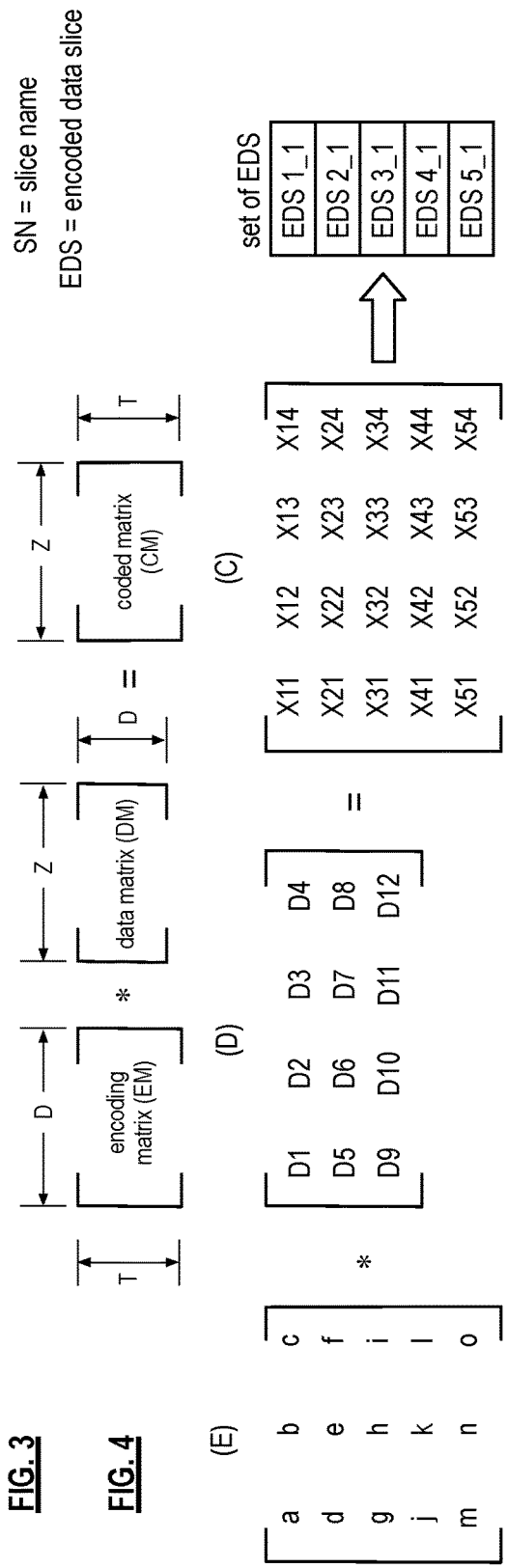

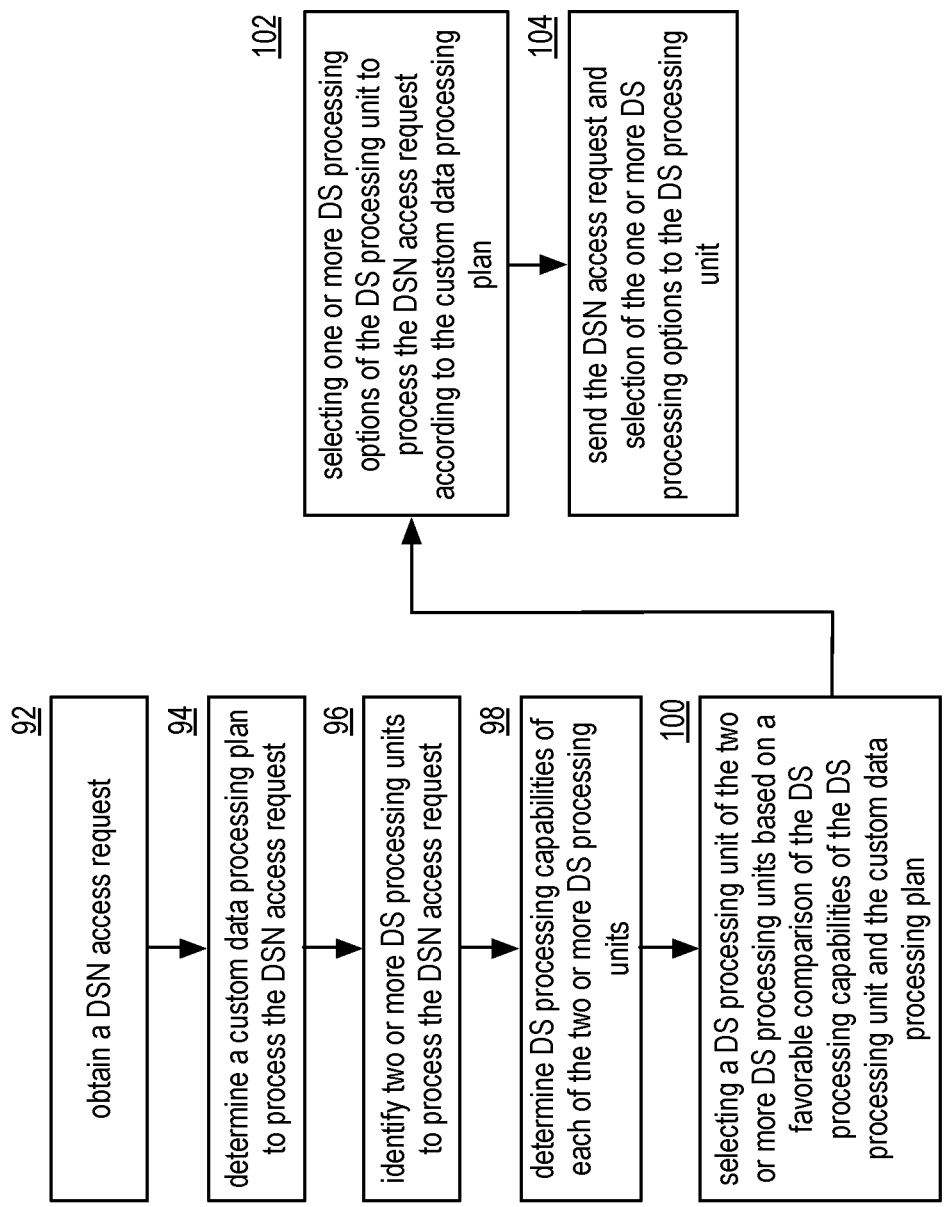

SELECTING A PROCESSING UNIT IN ACCORDANCE WITH A CUSTOMIZABLE DATA PROCESSING PLAN

CROSS-REFERENCE TO RELATED APPLICATIONS

This application claims priority pursuant to 35 U.S.C. § 120 as a continuation of U.S. patent application Ser. No. 16/050,583 entitled "User Customizable Data Processing Plan In A Dispersed Storage Network," filed Jul. 31, 2018, which claims priority pursuant to 35 U.S.C. § 120 as a continuation-in-part of U.S. patent application Ser. No. 14/325,433 entitled "Slice Migration In A Dispersed Storage Network," filed Jul. 8, 2014, issued as U.S. Pat. No. 10,067,831 on Sep. 4, 2018, which claims priority claims priority pursuant to 35 U.S.C. § 120 as a continuation-in-part of U.S. patent application Ser. No. 12/903,209 entitled, "Revision Synchronization Of A Dispersed Storage Network," filed Oct. 13, 2010, issued as U.S. Pat. No. 9,152,489 on Oct. 6, 2015, which claims priority pursuant to 35 U.S.C. § 119 to U.S. Provisional Application No. 61/290,775 entitled "Distributed Storage Data Synchronization," filed Dec. 29, 2009, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 12 is a flowchart illustrating an example of selecting a dispersed storage (DS) processing unit according to a custom data processing plan in accordance with the invention.

DETAILED DESCRIPTION OF THE INVENTION

Figure 1:
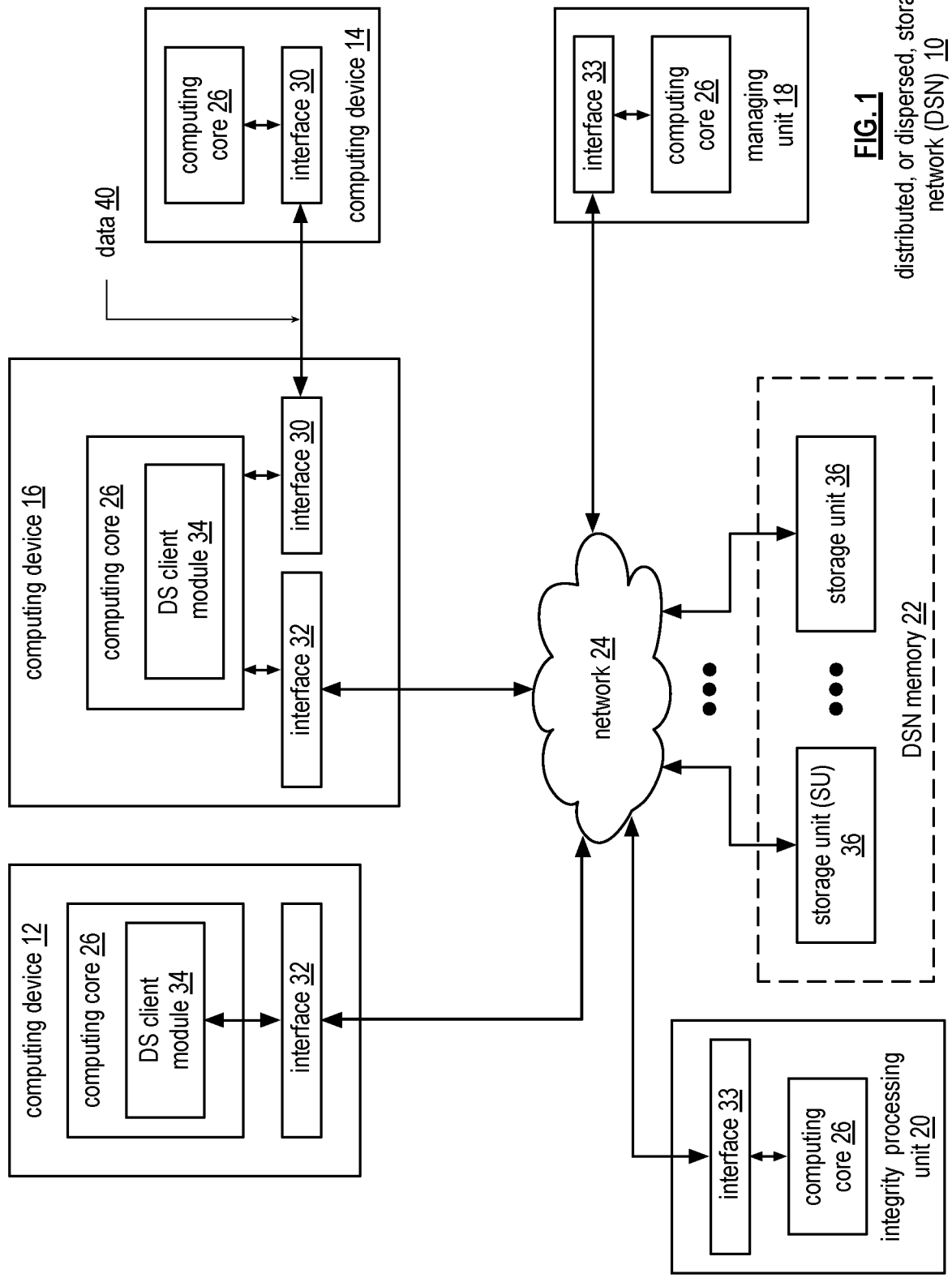
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
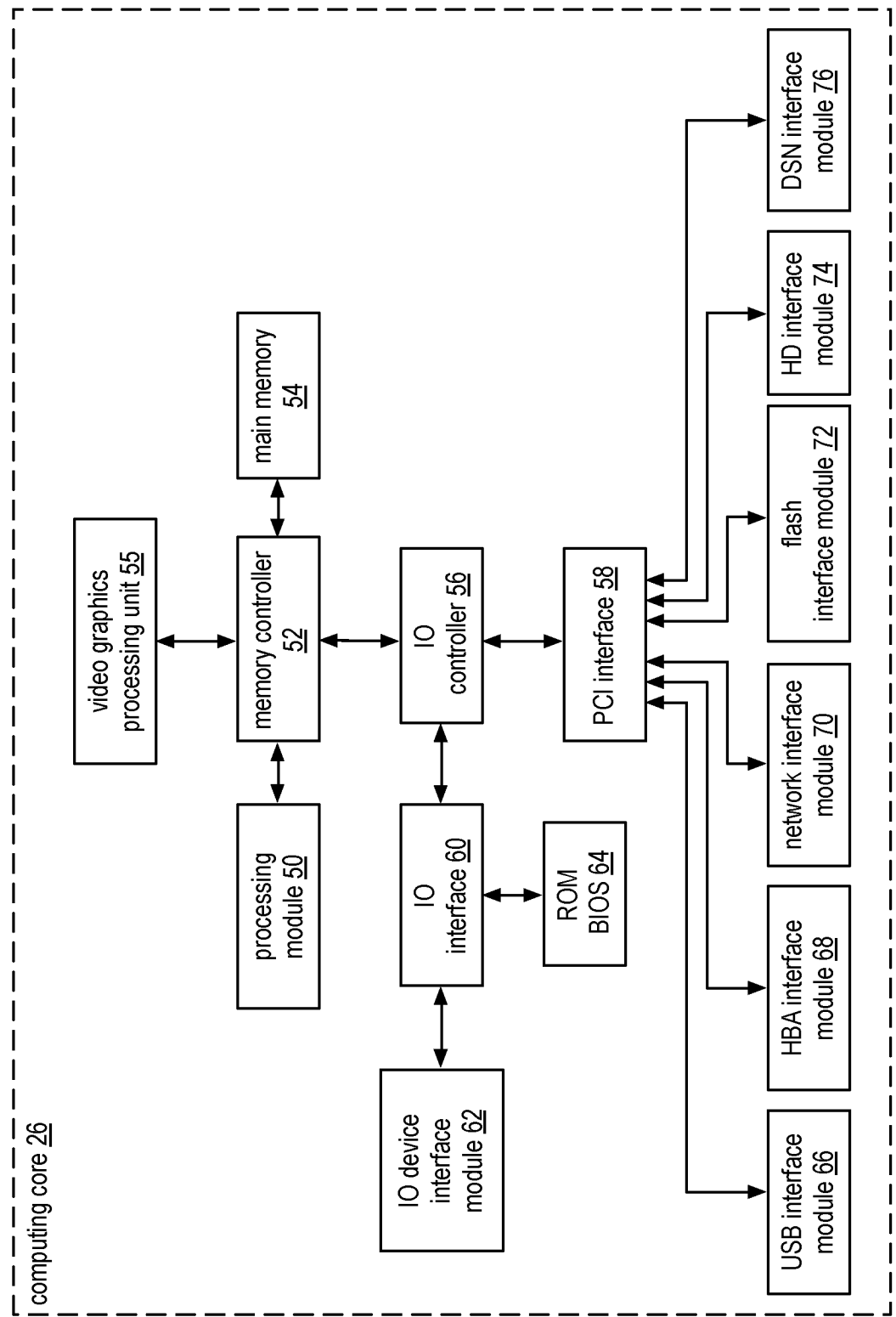
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage (DS) processing agent (i.e., a DS processing unit) for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 (i.e., user computing devices 12-14) individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
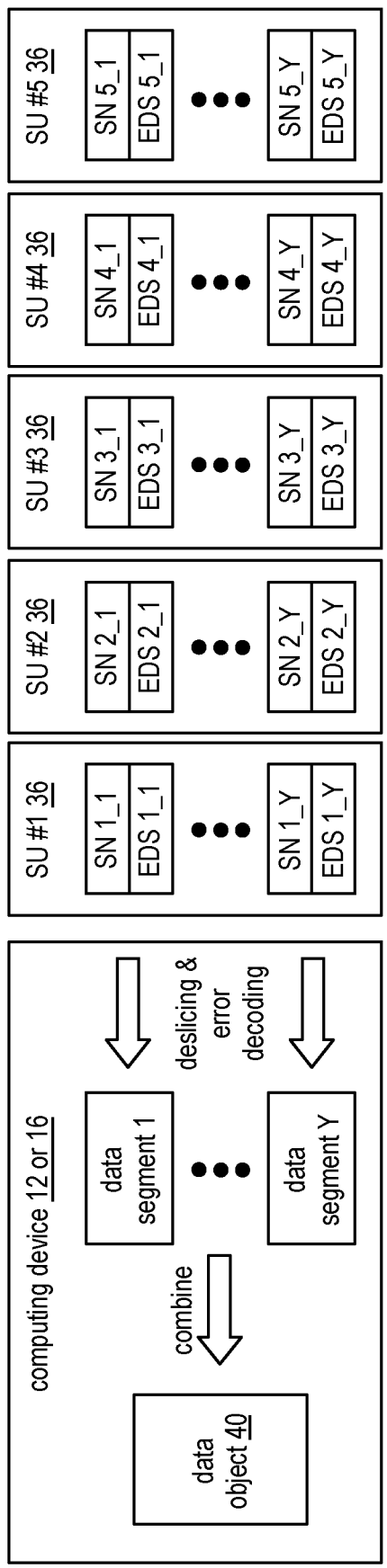
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
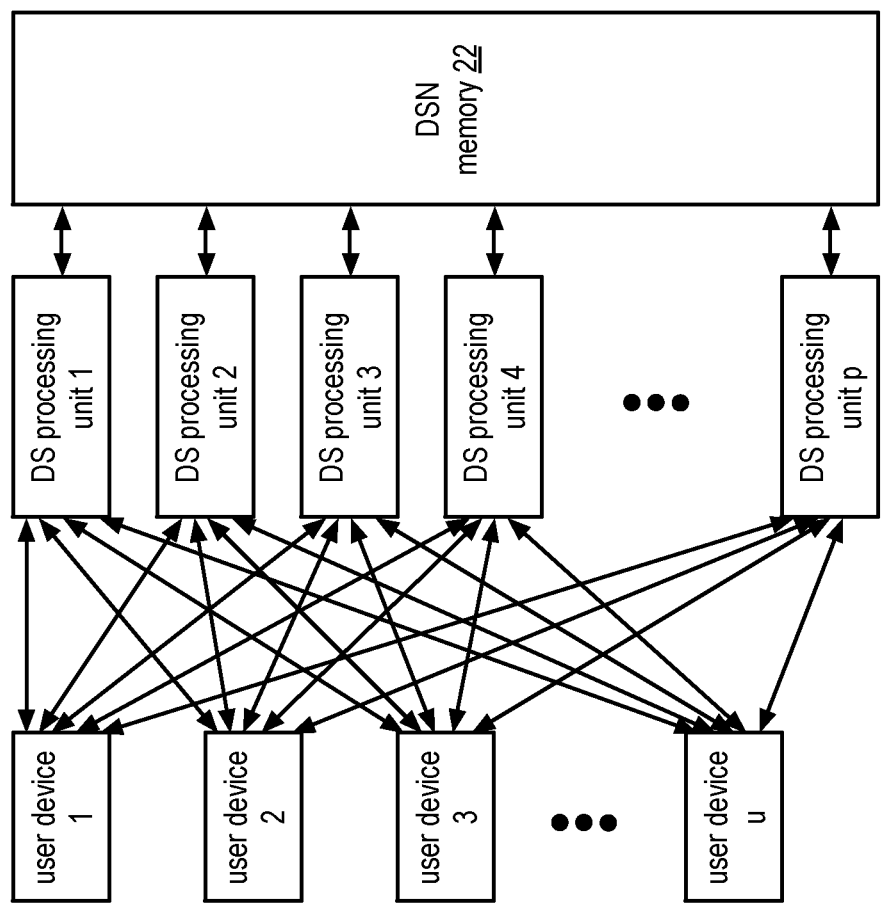
FIG. 9 is a schematic block diagram of an embodiment of the dispersed or distributed storage network (DSN) in accordance with the present invention.

FIG. 9 is a schematic block diagram of an embodiment of the dispersed or distributed storage network (DSN). As illustrated, the DSN includes a plurality of user devices 1-*u* (e.g., user computing devices 12-14 of FIG. 1), a plurality of DS processing units 1-*p* (e.g., computing device 16 of FIG. 1), and a DSN memory 22. In an example of operation, the user device 1 may determine a DS processing unit 3 to utilize based on matching DS processing unit attributes to DS processing unit requirements. In another example, user device 2 determines to utilize DS processing unit 3 when DS processing unit 3 has the most favorable availability history of the plurality of DS processing units 1-*p* and DS processing unit 3 is expected to continue to be available at a level that compares favorably with the user device 2 DS processing unit requirements.

In another example of operation, the user device 6 may determine a DS processing unit 5 to utilize based on a predetermination and/or initially on a predetermination followed by a potential subsequent modification based in part on actual performance. In another example, user device 3 determines to initially utilize DS processing unit 1 when DS processing unit 1 is listed in a predetermined table. Next, user device 3 determines to subsequently utilize DS processing unit 2 when DS processing unit 1 does not perform to a required level and DS processing unit 2 is the second choice.

In an example of operation, user device 7 provides DSN memory access authorization credentials when accessing the DSN memory 22 via DS processing unit 10. Next, the DS processing unit 10 verifies the authorization credentials. The DS processing unit 10 forwards a DSN memory access request to the DSN memory 22 when the authorization credential verification is favorable (e.g., on a list of authorized users for the particular item in the DSN memory 22). The DS processing unit 10 does not forward a DSN memory access request to the DSN memory 22 when the authorization credential verification is not favorable (e.g., not on a list of authorized users for the particular item in the DSN memory 22). The method of operation of the user device 1-*u* to determine the DS processing unit 1-*p* is discussed in greater detail with reference to FIG. 10.

In another example, DS processing unit 3 forwards the authorization credentials to the DSN memory 22 with the DSN memory access request (e.g., without verification by the DS processing unit 3). The DSN memory 22 verifies the authorization credentials. The DSN memory 22 processes the memory access request when the authorization credential verification is favorable. The DSN memory 22 does not process the memory access request when the authorization credential verification is not favorable.

Figure 10:
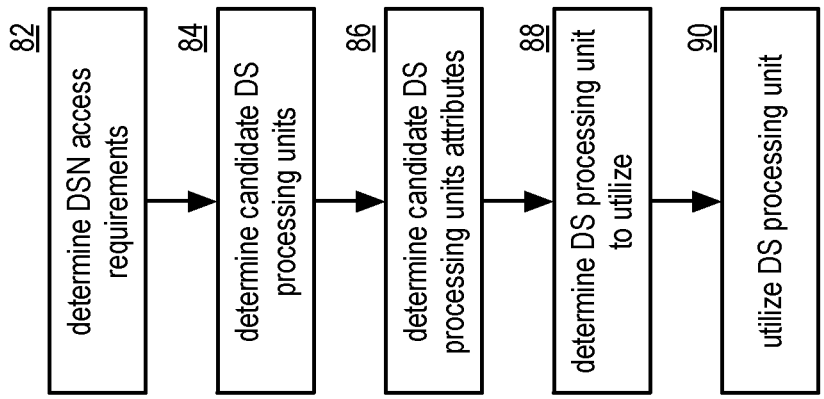
FIG. 10 is a flowchart illustrating an example of selecting a dispersed storage (DS) processing unit in accordance with the invention.

FIG. 10 is a flowchart illustrating an example of selecting a dispersed storage (DS) processing unit. The method begins at step 82 where a processing module (e.g., of a user device) determines dispersed storage network (DSN) memory access requirements. The requirements may include one or more of security requirements, performance requirements, and priority requirements. Such a determination may be based on one or more of a query, a data type, a data size, a security indicator, a performance indicator, a command, a predetermination, and a lookup.

The method continues at step 84 where the processing module determines candidate DS processing units based on one or more of a virtual DSN address to physical location table, a query, a message from one or more DS processing units, a data type, a data size, a security indicator, a performance indicator, a status indicator, a command, a predetermination, and a lookup. The method continues at step 86 where the processing module determines candidate DS processing units attributes where the attributes may include one or more of current capacity, current loading, uptime history, performance history, data types supported, data types not supported, security restrictions, and encryption algorithms supported. Such a determination may be based on one or more of a virtual DSN address to physical location table, a query, a message from one or more DS processing units, a data type, a data size, a security indicator, a performance indicator, a command, a predetermination, and a lookup. In an example, the processing module determines that DS processing unit 1 has an attribute of capacity above a threshold based on the performance indicator. In another example, the processing module determines that DS processing unit 4 has an attribute of a particular encryption algorithm based on the security indicator from a query.

The method continues at step 88 where the processing module determines a DS processing unit to utilize based on one or more of the DSN access requirements, the candidate DS processing units, the candidate processing units attributes, a comparison of the candidate processing units attributes to the DSN access requirements, a virtual DSN address to physical location table, a query, a message from one or more DS processing units, a data type, a data size, a security indicator, a performance indicator, a command, a predetermination, and a lookup. In an example, the processing module determines the DS processing unit such that substantially all of the requirements are met or exceeded. For instance, the processing module determines the DS processing unit that meets or exceeds the most requirements. The method continues at step 90 where the processing module utilizes the determined DS processing unit for the DSN access (e.g., store, retrieve, delete, check status).

Figure 11:
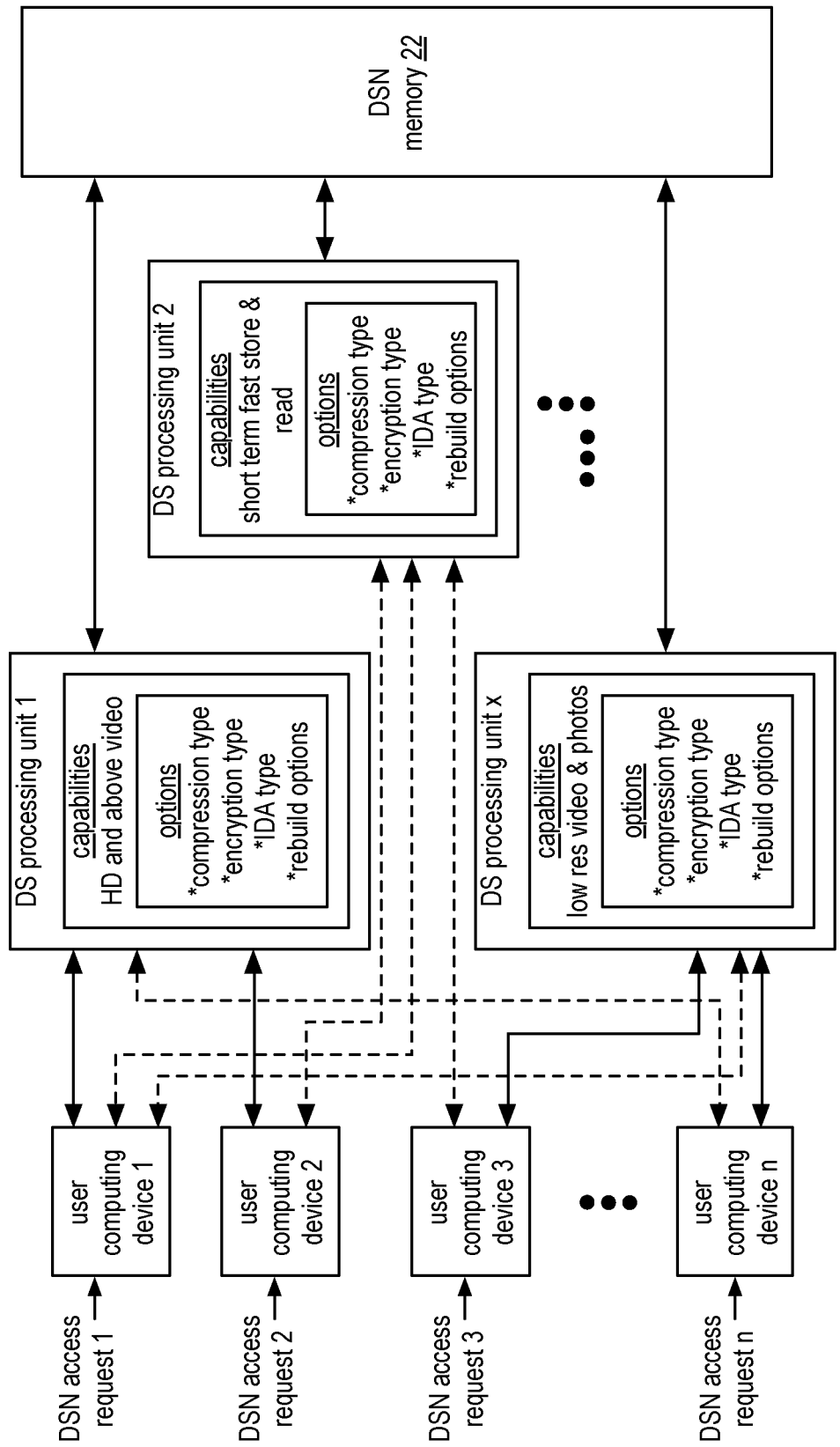
FIG. 11 is a schematic block diagram of another embodiment of the dispersed or distributed storage network (DSN) in accordance with the present invention.

FIG. 11 is a schematic block diagram of another embodiment of the dispersed or distributed storage network (DSN) that includes a plurality of user computing devices 1-*n* (e.g., user computing devices 12-14 of FIG. 1), a plurality of DS processing units 1-*x* (e.g., computing device 16 of FIG. 1), and a DSN memory 22.

In an example of operation, a user computing device of the user computing devices 1-*n* obtains a DSN access request (e.g., a request to store, retrieve, delete, check status, integrity check, etc., data to/from the DSN memory 22). For example user computing device 1 obtains DSN access request 1, user computing device 2 obtains DSN access request 2, user computing device 3 obtains DSN access request 3, and user computing device n obtains DSN access request n. The user computing device determines a custom data processing plan to process the DSN access request. The user computing device determines the custom data processing plan by selecting dispersed storage error encoding parameters for storing data of the DSN access request in accordance with a desired level of security requirement (e.g., for a higher desired level of security, per encoded data slice encryption, compression, and/or integrity checksums are selected), selecting dispersed storage error encoding parameters for storing data of the DSN access request in accordance with a desired level of performance requirement (e.g., for a fast read/write DSN access request, a small decode threshold is selected and for a long term store with slow write/read (i.e., archive) a larger decode threshold is selected), and/or selecting dispersed storage error encoding parameters for storing data of the DSN access request in accordance with a desired level of access requirement (e.g., if high frequency reading/writing of data of the DSN access request is expected, a smaller decode threshold number is selected).

For example, DSN access request 1 may be a request to write high definition (HD) video with moderate security, high performance, and high frequency of access. User computing device 1 determines a custom data processing plan that includes error encoding parameters for storing data of DSN access request 1 in accordance with a moderate level of security (e.g., per encoded data slice encryption and compression are selected), error encoding parameters for storing data of DSN access request 1 in accordance with high performance (e.g., a small decode threshold is selected), and error encoding parameters for storing data of DSN access request 1 in accordance with high frequency of access (e.g., a small decode threshold number is selected).

The custom data processing plan may also include user selected custom rebuild options. For example, the custom data processing plan may indicate that after x number of years, rebuilding of data is no longer required. As another example, the custom data processing plan may indicate that rebuilding should occur only if two or more encoded data slices require rebuilding.

The user computing device identifies two or more (DS) processing units of DS processing units 1-x of the DSN as possible candidates to process the DSN access request. The user computing device may identify the two or more DS processing units by accessing a virtual DSN table that includes, for the DS processing units 1-x, information regarding availability and one or more of: a data type, a data size, a security indicator, a performance indicator, and a status indicator. Alternatively, or additionally, the user computing device may identify the two or more DS processing units by receiving a command (e.g., a user input) identifying the two or more DS processing units, performing a lookup of available DS processing units of the plurality of DS processing units, identifying a predetermined two or more DS processing units as the two or more DS processing units, and/or receiving messages from DS processing units of the plurality of DS processing units 1-x in response to a query-response protocol to obtain the information.

When the information is obtained, (e.g., via accessing a DSN table and/or querying the DS processing units 1-x) the user computing device correlates the information regarding the one or more of: the data type, the data size, the security indicator, the performance indicator, and the status indicator with the custom data processing plan. The user computing device can then identify the two or more DS processing units that are not only available to process the DSN access request, but have information that correlates with the custom data processing plan.

For example, user computing device 1 accesses a virtual DSN table and identifies DS processing unit 1, DS processing unit 2, and DS processing unit x as available to process DSN access request 1. The virtual DSN table also indicates information that DS processing unit x processes low resolution (res) video and photos. Because this information does not correlate with user computing device 1's custom data processing plan (i.e., to process HD video), DS processing unit x is eliminated as a candidate and DS processing unit 1 and DS processing unit 2 are left as options.

The user computing device determines DS processing capabilities of each of the two or more DS processing units identified as candidates. The DS processing capabilities include one or more of current capacity, current loading, uptime history, performance history, data types supported (e.g., high definition (HD) and above video, low resolution video, etc.), data types not supported, DSN access requests supported (e.g., the DS processing unit is a dedicated write or read unit), security restrictions, and encryption algorithms supported.

For example, user computing device 1 determines that DS processing unit 1 has DS processing capabilities of processing HD and above video and DS processing unit 2 has DS processing capabilities to perform short term fast stores and reads. However, DS processing unit 2 has a history of low performance and does not support processing of HD video.

The user computing device selects a DS processing unit of the two or more DS processing units to process the DSN access request based on a favorable comparison of the DS processing capabilities of the DS processing unit and the custom data processing plan. For example, while DS processing unit 2 has DS processing capabilities to process short term fast stores and reads which compares favorably to computing device 1's custom data processing plan, DS processing unit 2's DS processing capabilities also indicate that it does not process HD video and that it has a history of poor performance. Therefore, user computing device 1 selects DS processing unit 1 to process DSN access request 1 because DS processing unit 1's DS processing capabilities compare most favorably to user computing device 1's custom data processing plan.

The user computing device selects one or more DS processing options of the DS processing unit to process the DSN access request according to the custom data processing plan. The one or more one or more DS processing options include one or more of a compression type, encryption type, encoding function type (e.g., IDA type), and rebuilding options. For example, user computing device 1's custom data processing plan indicates a high security level, high performance, and high frequency of access. Therefore, user computing device 1 selects DS processing options of DS processing unit 1 according to those requirements.

The user computing device sends the DSN access request and selection of the one or more DS processing options to the DS processing unit, where the DS processing unit processes the DSN access request in accordance with the one or more DS processing options.

FIG. 12 is a flowchart illustrating an example of selecting a dispersed storage (DS) processing unit according to a custom data processing plan. The method begins with step 92 where the a user computing device of a plurality of user computing devices of the DSN obtains a DSN access request (e.g., a request to store, retrieve, delete, check status, integrity check, etc., data to/from the DSN memory 22). The method continues with step 94 where the user computing device determines a custom data processing plan to process the DSN access request. The user computing device determines the custom data processing plan by selecting dispersed storage error encoding parameters for storing data of the DSN access request in accordance with a desired level of security requirement (e.g., for a higher desired level of security, per encoded data slice encryption, compression, and/or integrity checksums are selected), selecting dispersed storage error encoding parameters for storing data of the DSN access request in accordance with a desired level of performance requirement (e.g., for a fast read/write DSN access request, a small decode threshold is selected and for a long term store with slow write/read (i.e., archive) a larger decode threshold is selected), and/or selecting dispersed storage error encoding parameters for storing data of the DSN access request in accordance with a desired level of access requirement (e.g., if high frequency reading/writing of data of the DSN access request is expected, a smaller decode threshold number is selected).

The custom data processing plan may also include user selected custom rebuild options. For example, the custom data processing plan may indicate that after x number of years, rebuilding of data is no longer required. As another example, the custom data processing plan may indicate that rebuilding should occur only if two or more encoded data slices require rebuilding.

The method continues with step 96 where the user computing device identifies two or more (DS) processing units of a plurality of DS processing units of the DSN as possible candidates to process the DSN access request. The user computing device may identify the two or more DS processing units by accessing a virtual DSN table that includes, for the plurality of DS processing units, information regarding availability and one or more of: a data type, a data size, a security indicator, a performance indicator, and a status indicator. Alternatively, or additionally, the user computing device may identify the two or more DS processing units by receiving a command (e.g., a user input) identifying the two or more DS processing units, performing a lookup of available DS processing units of the plurality of DS processing units, identifying a predetermined two or more DS processing units as the two or more DS processing units, and/or receiving messages from DS processing units of the plurality of DS processing units in response to a query-response protocol to obtain the information.

When the information is obtained, (e.g., via accessing a DSN table and/or querying the plurality of DS processing units) the user computing device correlates the information regarding the one or more of: the data type, the data size, the security indicator, the performance indicator, and the status indicator with the custom data processing plan. The user computing device can then identify the two or more DS processing units that are not only available to process the DSN access request, but have information that correlates with the custom data processing plan.

The method continues with step 98 where the user computing device determines DS processing capabilities of each of the two or more DS processing units identified as candidates. The DS processing capabilities include one or more of current capacity, current loading, uptime history, performance history, data types supported (e.g., high definition (HD) and above video, low resolution video, etc.), data types not supported, DSN access requests supported (e.g., the DS processing unit is a dedicated write or read unit), security restrictions, and encryption algorithms supported.

The method continues with step 100 where the user computing device selects a DS processing unit of the two or more DS processing units to process the DSN access request based on a favorable comparison of the DS processing capabilities of the DS processing unit and the custom data processing plan. The method continues with step 102 where the user computing device selects one or more DS processing options of the DS processing unit to process the DSN access request according to the custom data processing plan. The one or more one or more DS processing options include one or more of a compression type, encryption type, encoding function type (e.g., IDA type), and rebuilding options.

The method continues with step 102 where the user computing device sends the DSN access request and selection of the one or more DS processing options to the DS processing unit, where the DS processing unit processes the DSN access request in accordance with the one or more DS processing options.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c.

As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    determining, by a computing device of a plurality of computing devices of a storage network, a data processing plan for processing an access request based on a data type of the access request and one or more storage network access requirements of the access request;
    identifying, by the computing device, two or more processing units of a plurality of processing units of the storage network based on the data processing plan and availability information of the plurality of processing units;
    determining, by the computing device, processing capabilities of each of the two or more processing units;
    selecting, by the computing device, a processing unit of the two or more processing units to process the access request based on a favorable comparison of the processing capabilities of the processing unit and the data processing plan;
    selecting, by the computing device, one or more processing options of the processing unit to process the access request according to the data processing plan; and
    sending, by the computing device, the access request and selection of the one or more processing options to the processing unit, wherein the processing unit processes the access request in accordance with the one or more processing options.

2. The method of claim 1, wherein the determining the data processing plan includes one or more of:
    selecting, by the computing device, dispersed storage error encoding parameters for storing data of the access request in accordance with a desired level of security requirement;
    selecting, by the computing device, the dispersed storage error encoding parameters for storing the data of the access request in accordance with a desired level of performance requirement; and
    selecting, by the computing device, the dispersed storage error encoding parameters for storing the data of the access request in accordance with a desired level of access requirement.

3. The method of claim 1, wherein the identifying the two or more processing units comprises one or more of:
    accessing, by the computing device, a virtual storage network table that includes, for the plurality of processing units, information regarding availability and one or more of: a data type, a data size, an access request processing type, a security indicator, a performance indicator, and a status indicator;
    receiving, by the computing device, a command identifying the two or more processing units;
    performing, by the computing device, a lookup of available processing units of the plurality of processing units;
    identifying, by computing device, a predetermined two or more processing units as the two or more processing units; and
    receiving, by the computing device, messages from processing units of the plurality of processing units in response to a query-response protocol to obtain the information.

4. The method of claim 3, wherein the identifying the two or more processing units further comprises:
    when the information is obtained, correlating, by the computing device, the information regarding the one or more of: the data type, the data size, the security indicator, the performance indicator, and the status indicator with the data processing plan; and
    identifying, by the computing device, processing units having information that correlates with the data processing plan as the two or more processing units.

5. The method of claim 1, wherein the processing capabilities include one or more of:
    current capacity;
    current loading;
    uptime history;
    performance history;
    data types supported;
    data types not supported;
    access requests supported;
    security restrictions; and
    encryption algorithms supported.

6. The method of claim 1, wherein the processing options include one or more of:
    compression type;
    encryption type;
    encoding function type; and
    rebuilding options.

7. The method of claim 1, wherein the computing device is a user computing device.

8. A computing device of a plurality of computing devices of a storage network, the computing device comprises:
    an interface;
    memory; and
    a processing module operably coupled to the memory and the interface, wherein the processing module is operable to:
        determine a data processing plan for processing an access request based on a data type of the access request and one or more storage network access requirements of the access request;
        identify two or more processing units of a plurality of processing units of the storage network based on the data processing plan and availability information of the plurality of processing units;
        determine processing capabilities of each of the two or more processing units;
        select a processing unit of the two or more processing units to process the access request based on a favorable comparison of the processing capabilities of the processing unit and the data processing plan;
        select one or more processing options of the processing unit to process the access request according to the data processing plan; and send the access request and selection of the one or more processing options to the processing unit, wherein the processing unit processes the access request in accordance with the one or more processing options.

9. The computing device of claim 8, wherein the processing module is operable to determine the data processing plan by one or more of:
   selecting dispersed storage error encoding parameters for storing data of the access request in accordance with a desired level of security requirement;
   selecting the dispersed storage error encoding parameters for storing the data of the access request in accordance with a desired level of performance requirement; and
   selecting the dispersed storage error encoding parameters for storing the data of the access request in accordance with a desired level of access requirement.

10. The computing device claim 8, wherein the processing module is operable to identify the two or more processing units by one or more of:
   accessing a virtual storage network table that includes, for the plurality of processing units, information regarding availability and one or more of: a data type, a data size, an access request processing type, a security indicator, a performance indicator, and a status indicator;
   receiving a command identifying the two or more processing units;
   performing a lookup of available processing units of the plurality of processing units;
   identifying a predetermined two or more processing units as the two or more processing units; and
   receiving messages from processing units of the plurality of processing units in response to a query-response protocol to obtain the information.

11. The computing device of claim 10, wherein the processing module is operable to further identify the two or more processing units by:
   when the information is obtained, correlating the information regarding the one or more of: the data type, the data size, the security indicator, the performance indicator, and the status indicator with the data processing plan; and
   identifying processing units having information that correlates with the data processing plan as the two or more processing units.

12. The computing device of claim 8, wherein the processing capabilities include one or more of:
   current capacity;
   current loading;
   uptime history;
   performance history;
   data types supported;
   data types not supported;
   access requests supported;
   security restrictions; and
   encryption algorithms supported.

13. The computing device of claim 8, wherein the processing options include one or more of:
   compression type;
   encryption type;
   encoding function type; and
   rebuilding options.

14. The computing device of claim 8, wherein the computing device is a user computing device.

15. A non-transitory computer readable memory comprises:
   a first memory element that stores operational instructions that, when executed by a computing device of a plurality of computing devices of a storage network, causes the computing device to:
      determine a data processing plan for processing an access request based on a data type of the access request and one or more storage network access requirements of the access request;
      identify two or more processing units of a plurality of processing units of the storage network based on the data processing plan and availability information of the plurality of processing units;
      determine processing capabilities of each of the two or more processing units;
      select a processing unit of the two or more processing units to process the access request based on a favorable comparison of the processing capabilities of the processing unit and the data processing plan;
      select one or more processing options of the processing unit to process the access request according to the data processing plan; and
      send the access request and selection of the one or more processing options to the processing unit, wherein the processing unit processes the access request in accordance with the one or more processing options.

16. The non-transitory computer readable memory of claim 15, wherein the first memory element further stores operational instructions that, when executed by the computing device, causes the computing device to determine the data processing plan by one or more of:
   selecting dispersed storage error encoding parameters for storing data of the access request in accordance with a desired level of security requirement;
   selecting the dispersed storage error encoding parameters for storing the data of the access request in accordance with a desired level of performance requirement; and
   selecting the dispersed storage error encoding parameters for storing the data of the access request in accordance with a desired level of access requirement.

17. The non-transitory computer readable memory of claim 15, wherein the first memory element further stores operational instructions that, when executed by the computing device, causes the computing device to identify the two or more processing units by one or more of:
   accessing a virtual storage network table that includes, for the plurality of processing units, information regarding availability and one or more of: a data type, a data size, an access request processing type, a security indicator, a performance indicator, and a status indicator;
   receiving a command identifying the two or more processing units;
   performing a lookup of available processing units of the plurality of processing units;
   identifying a predetermined two or more processing units as the two or more processing units; and
   receiving messages from processing units of the plurality of processing units in response to a query-response protocol to obtain the information.

18. The non-transitory computer readable memory of claim 17, wherein the first memory element further stores operational instructions that, when executed by the computing device, causes the computing device to further identify the two or more processing units by one or more of:
   when the information is obtained, correlating the information regarding the one or more of: the data type, the data size, the security indicator, the performance indicator, and the status indicator with the data processing plan; and identifying processing units having information that correlates with the data processing plan as the two or more processing units.

19. The non-transitory computer readable memory of claim 15, wherein the processing capabilities include one or more of:
- current capacity;
- current loading;
- uptime history;
- performance history;
- data types supported;
- data types not supported;
- access requests supported;
- security restrictions; and
- encryption algorithms supported.

20. The non-transitory computer readable memory of claim 15, wherein the processing options include one or more of:
- compression type;
- encryption type;
- encoding function type; and
- rebuilding options.

\* \* \* \* \*